Aug. 7, 1923.
M. ROTSTEIN ET AL
CAMP STOVE
Filed Aug. 17, 1922
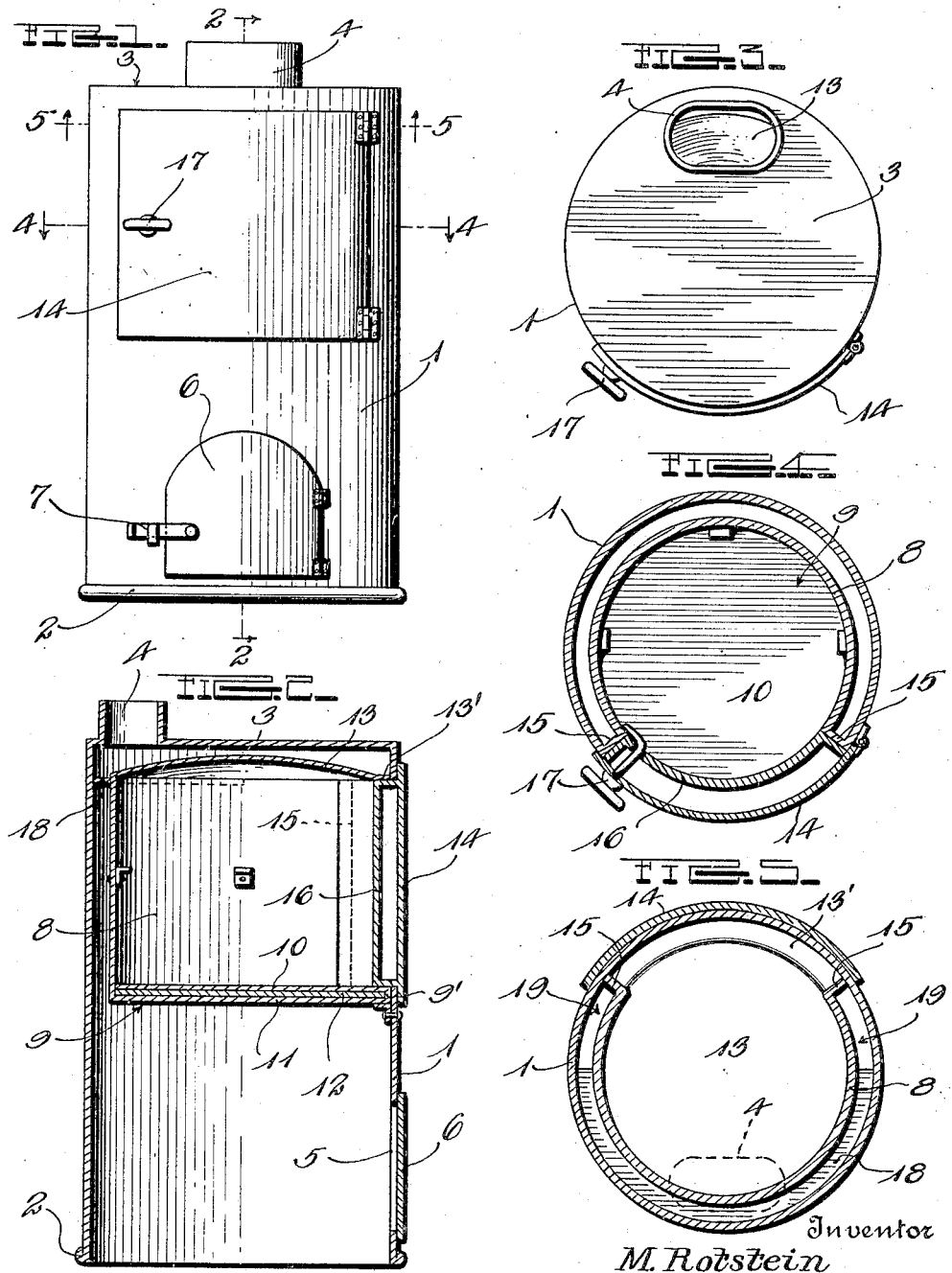
Inventor
M. Rotstein
And
R. Nicholson Patented Aug. 7, 1923.

1,464,271

UNITED STATES PATENT OFFICE.

MORRIS ROTSTEIN AND ROBERT NICHOLSON, OF VICKSBURG, MISSISSIPPI.

CAMP STOVE.

Application filed August 17, 1922. Serial No. 582,477.

*To all whom it may concern:*

Be it known that we, MORRIS ROTSTEIN and ROBERT NICHOLSON, citizens of the United States, residing at Vicksburg, in the county of Warren and State of Mississippi, have invented certain new and useful Improvements in Camp Stoves; and we do declare the following to be a full, clear, and exact description of the invention, such as will enable others skilled in the art to which it appertains to make and use the same.

This invention relates to an improved stove for use while camping and one object of the invention is to provide a stove which can be formed of heavy sheet metal and may be placed over an open fire built upon the ground.

Another object of the invention is to so construct this stove that it may be provided with a baking chamber positioned within an outer casing, the baking chamber being spaced from the walls of the outer casing to permit the products of combustion to pass upwardly around the baking chamber and thus cause the baking chamber to thoroughly heated.

Another object of the invention is to so mount this baking chamber that direct passage of the products of combustion upwardly around the rear portion of the baking chamber and directly into an outlet formed in the top of the outer casing will be prevented and the products of combustion thus caused to be retarded and the baking chamber thoroughly heated.

Another object of the invention is to so construct this stove that the doorway through which access is had to the baking chamber may be in the form of a mouth extension provided with upper, lower and side wall-forming portions and may be closed by a door which is hollow and shaped to extend into the mouth of the baking chamber.

Another object of the invention is to so construct the baking chamber that the bottom will not become overheated when the stove is in use.

This invention is illustrated in the accompanying drawings, wherein:

Figure 1 is a view showing the improved stove in front elevation.

Figure 2 is a vertical sectional view taken along the line 2—2 of Fig. 1.

Figure 3 is a top plan view of the stove.

Figure 4 is a transverse sectional view taken along the line 4—4 of Fig. 1.

Figure 5 is a transverse sectional view taken along the line 5—5 of Fig. 1.

This stove is provided with an outer casing 1 which is formed of heavy sheet metal and in the present illustration is cylindrical. The lower end is open and in order to reinforce the lower end, there has been provided a bead 2. At the upper end, there has been provided a head 3 having an outlet 4 extended upwardly so that if desired, a smoke pipe can be connected with this outlet. A fuel doorway 5 is provided in the lower portion of the outer casing and a closure door 6 is provided for this fuel doorway so that after fuel has been passed through the passage 5, the door may be closed and secured by the latch indicated in general by the numeral 7. It will thus be seen that this stove may be put in place upon the ground and a fire built in the lower portion, the fire being formed of wood, soft coal, or any other suitable material.

The baking chamber 8 is mounted in the upper portion of the outer casing 1 and will also be formed of sheet metal. The bottom 9 of the baking chamber is provided with upper and lower plates 10 and 11 formed of sheet metal, these plates being in spaced relation and the space between them being filled with asbestos or a similar substance 12 which will serve to prevent the bottom from becoming overheated. The top 13 of this baking chamber may be convex as shown if desired. At their forward portions, the top and bottom of the baking chamber are provided with lip extensions 9' and 13', each of which is formed as shown in Fig. 2 and engages the wall of the outer casing at the upper and lower ends of the doorway which is formed therein and closed by the door 14. The walls of the baking chamber are also formed of sheet metal and the sheet from which the walls are formed has the end portions thereof bent to provide flange portions 15 which are connected with the walls of the outer casing at the sides of the upper doorway and along the sides of the tongue extensions 9' and 13' of the top and bottom of the baking chamber. It will thus be seen that when the door 14 is swung open, articles may be inserted and removed through the baking chamber mouth portion formed by the side flanges and top and bottom extensions. This door 14 is hollow and provided with an inner wall 16 which forms a continuation of the circular wall of the baking chamber when the door is closed. This inner wall is provided with upper, lower and side flanges to engage with the portions 9', 13' and 15 of the baking chamber and thus provide a very good closure for the baking chamber. Therefore, when the door is closed and the latch 17 turned to the operative position shown in Fig. 4, the door will be firmly held shut and heat retained in the baking chamber. As previously stated, it is desired to prevent the products of combustion from passing directly upwardly around the rear portion of this baking chamber and through the outlet 4 and therefore there has been provided a baffle strip 18 which extends about the rear portion of this baking chamber at the upper end as shown clearly in Figs. 2 and 5. This strip has its end portions terminating in spaced relation to the flanges 15 so that spaces 19 will be left through which the products of combustion will pass. It will thus be seen that the products of combustion in moving upwardly will be retarded in its upward movement and the oven will be thoroughly heated at substantially the same temperature at all points.

We claim:

An oven comprising a casing having walls provided with a doorway and at its upper end having a head provided with a products of combustion outlet, a baking chamber in said casing spaced from the walls and top thereof and having a top, a bottom, and side walls, the top and bottom being provided with lip extensions engaging said casing at the upper and lower ends of said doorway and having a width equal to the doorway and the walls of the baking chamber having their end portions bent to provide flanges extending along the sides of the lip extensions and engaging the casing at the sides of the doorway to provide with the lip extensions a mouth portion for the baking chamber and a closure door for the doorway having a reduced hollow portion extending from its inner face for fitting into the doorway and filling the mouth portion of the baking chamber and having close fitting engagement with said lip extensions and flanges.

In testimony whereof we have hereunto affixed our signatures.

MORRIS ROTSTEIN.
ROBT. NICHOLSON.